March 27, 1934.   F. B. HEWEL   1,952,671
PACKING GLAND
Filed Nov. 18, 1932   2 Sheets-Sheet 1

WITNESS

INVENTOR
Frank B. Hewel.
BY
William R. Coley
ATTORNEY

March 27, 1934.  F. B. HEWEL  1,952,671
PACKING GLAND
Filed Nov. 18, 1932  2 Sheets-Sheet 2

WITNESS
Wm. C. Groome

INVENTOR
Frank B. Hewel.
BY
William R. Coley
ATTORNEY

Patented Mar. 27, 1934

1,952,671

UNITED STATES PATENT OFFICE 1,952,671

PACKING GLAND

Frank B. Hewel, Pittsburgh, Pa.

Application November 18, 1932, Serial No. 643,144

6 Claims. (Cl. 286—7)

My invention relates to packing glands and the like, and has particular relation to packing glands or stuffing boxes for water pumps on automobiles.

One object of my invention is to provide an effective packing gland for preventing the leakage of water around the impeller shaft in a pump and having a simplified construction involving a minimum number of parts.

Another object of my invention is to provide a packing gland wherein the packing material turns within a shell or outer hollow member by reason of engagement with or anchoring on a roughened portion or projections on the outer surface of the impeller shaft.

A further object of my invention is to provide an impeller shaft with an intermediate threaded portion for anchoring packing material and turning it within the smooth internal face of an enclosing shell.

Still another object of my invention is to provide a packing gland having a pump impeller secured near one end of a threaded shaft, together with a stationary hollow structure spacedly surrounding the shaft and having a running fit therewith near the impeller by means of a bushing, the packing material being disposed to turn within the remainder of the hollow structure by engagement or anchoring with the intermediate threaded portion of the shaft.

Other objects of my invention will become evident from the following detailed description, taken in conjunction with the accompanying drawings, wherein Figure 1 and Fig. 2 are views in top and side elevation, respectively, of a packing gland constructed in accordance with my present invention;

Figure 1:
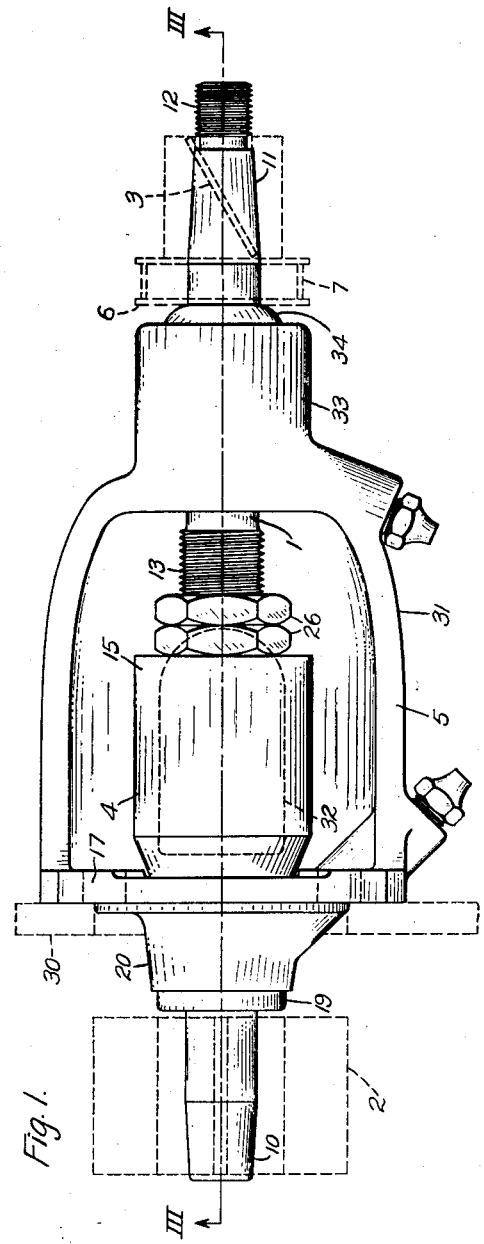
Figure 2:
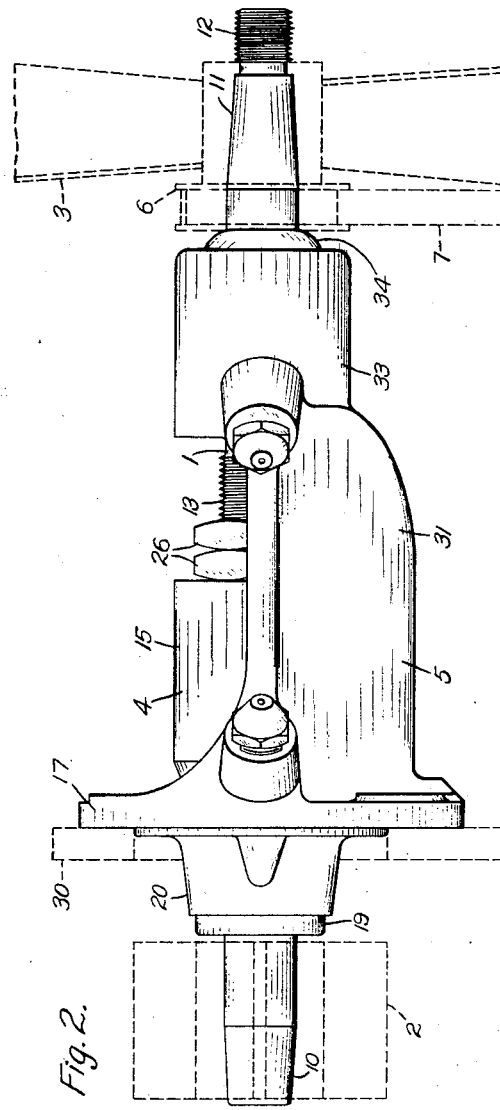
Figure 3:
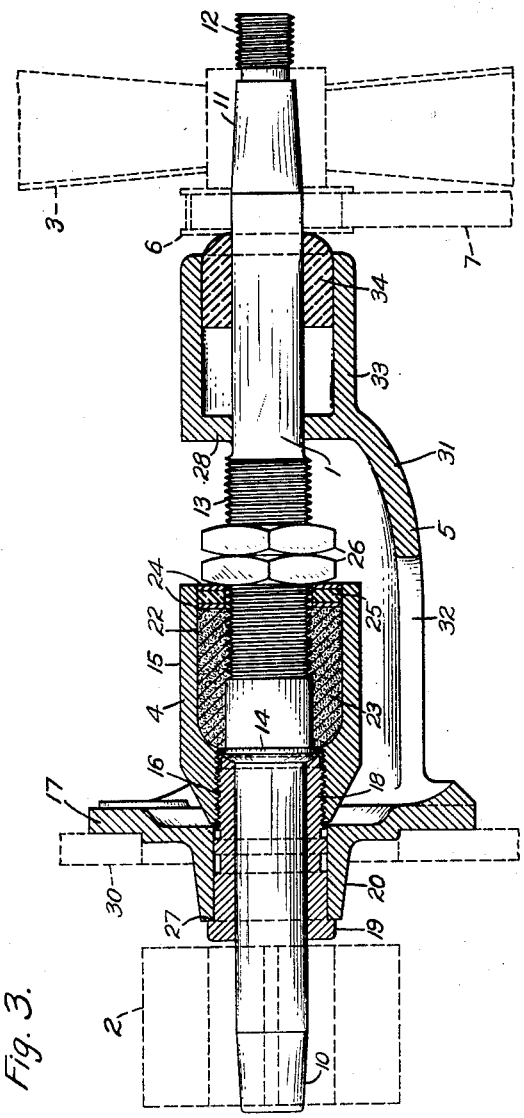
Fig. 3 is a longitudinal section taken along the line III—III of Fig. 1.
Figure 4:
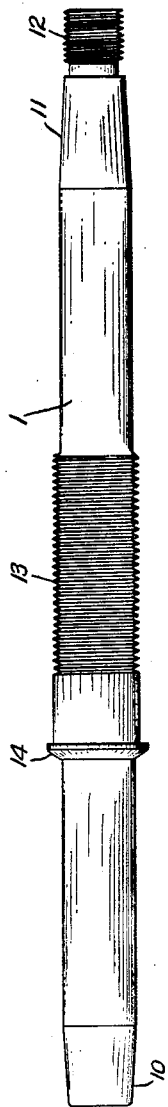
Fig. 4 is a view in elevation of the impeller shaft shown in the other figures.

Referring to the drawings, the structure here shown comprises an impeller shaft 1, shown in elevation in Fig. 4, having a pump impeller 2 secured at one end thereof and a radiator fan 3 secured near the other end; a hollow member or shell 4 for containing packing material and cooperating to prevent leakage of water from the pump impeller along the shaft 1; and a frame or supporting structure 5 for the remaining parts.

The pump impeller 2 may be of any familiar form and is shown as having a driving fit on the tapered end 10 of the shaft 1. The fan 3 may also be of any well known type, being secured to the other tapered end 11 of the shaft 1 and being held in position by a suitable nut (not shown) attached to the threaded end 12 of the shaft. The shaft 1, impeller 2 and fan 3 may be driven in the usual way by means of a sheave 6 suitably secured to the shaft near the fan 3 and driven by a V-belt or other power-transmitting member 7.

The impeller shaft 1, in addition, comprises an intermediate threaded portion 13, preferably of relatively fine pitch, together with an adjacent shoulder 14 for a purpose to be set forth.

The hollow structure or shell 4 comprises a thin-walled cylindrical member 15 which is tapered at its outer end and has an internal threaded portion 16 within the taper for engaging a correspondingly threaded cylindrical portion 18 of a bushing or journal 19, of brass or other suitable material, for the shaft 1, that is rigidly secured within a hollow boss or hub 20 of the end portion 17 of the frame structure 5. The cylindrical shell 15 may thus be screwed on the threaded portion 18 of the bushing 19 until its tapered end fits tightly against the inside face of the frame portion 17, this action likewise serving to hold the bushing 19 in its proper place by pulling its shoulder 27 tightly against the outer end of the boss 20.

The shell 15 is provided with a smooth internal bore or surface 22 within which is loosely disposed suitable packing material 23, which thus engages the threaded portion 13 of the shaft 1 and is anchored thereby in such a way as to turn with the shaft 1 within the smooth cylindrical surface 22.

The shoulder 14 of the shaft 1 tightly fits against the inner end of the threaded portion 18 of the bushing 19, and suitable steel washers 24 with an intermediate rubber gasket 25 are placed over the intermediate threaded portion 13 of the shaft 1, while two locking nuts 26 are threaded over the portion 13 to bear against the adjacent steel washer 24 and hold the packing material 23 in its proper position within the shell 15.

In this way, a close mechanical fit of parts is provided in the illustrated structure between the impeller 2 and the open or unenclosed intermediate portion of the shaft 1, whereas the packing material 23 fills the space between the shell 15 and the enclosed portion of the shaft 1, including a section of the threaded portion 13, the packing being held in place to prevent leakage therefrom by means of the rubber gasket 25 and the accompanying steel washers 24.

The dotted lines indicated by the reference character 30 represent the upper portion of the gasoline engine frame to which the square flat portion 17 of the frame 5 may be suitably bolted. In addition, the frame 5 comprises a bowl-like portion 31 having a bottom opening 32 and a hollow boss or bearing 33 having a rubber journal member 34 for supporting the corresponding portion of the shaft 1, in addition to the web 28 of the bearing 33 through which the shaft 1 has a running fit.

In operation, it will be seen that the packing gland described above maintains a substantially water-tight connection to prevent leakage of water along the impeller shaft 1 from the impeller 2, the packing material itself being securely anchored to the impeller shaft 1 by the intermediate threaded section 13 and turning within the hollow shell 15 as the impeller shaft rotates.

I have thus provided an effective packing gland that is particularly adapted for use in connection with the water pumps for automobiles, my gland having a relatively small number of parts and providing a relatively large-diameter and efficient heat-radiating bearing surface 22 for the packing material within the hollow shell 15, this large diameter bearing surface being insured by the positive anchoring or gripping action upon the packing material 23 of the relatively large number of threads on the shaft portion 13.

I do not wish to be restricted to the specific structural deails or arrangement of parts herein set forth, as various modifications thereof may be effected without departing from the spirit and scope of my invention. I desire, therefore, that only such limitations shall be imposed as are indicated in the appended claims.

I claim as my invention:

1. A packing gland comprising a rotatable member having projections on its outer circumferential surface, a stationary hollow member extending substantially at right angles to said projections and spacedly surrounding said rotatable member, packing material disposed between said members and rotatable with said rotatable member by engagement with said projections, said projections being spaced along said rotatable member and substantially coextensive with said packing.

2. A packing gland comprising a rotatable threaded member, a stationary hollow member spacedly surrounding said threaded member, and packing material disposed between said members in engagement with the threads of said rotatable member and rotatable with said threaded member by engagement with the threads thereof.

3. A packing gland comprising a rotatable shaft having projections on its outer surface, a frame member, a bushing interposed between said shaft and said frame member and having a threaded inner end, a stationary hollow member having an internal diameter larger than said shaft and secured on the threaded end of said bushing and extending over said projections, and packing material disposed within said extended portion of said hollow member to turn with said shaft by engaging said projections thereof.

4. A packing gland comprising a rotatable shaft having an intermediate threaded portion, a frame member, a bushing interposed between said shaft and said frame member and having a threaded inner end, a stationary hollow member having an internal diameter larger than said shaft and secured on the threaded end of said bushing tightly against said frame and extending over said threaded portion of said shaft, and packing material disposed within said extended portion of said hollow member to turn with said shaft by engaging said threaded portion thereof.

5. A packing gland comprising a rotatable shaft having projections on its outer surface for anchoring packing material, a frame member, a bushing interposed between said shaft and said frame member and having a threaded inner end, and a stationary hollow member having an internal diameter larger than said shaft and secured on the threaded end of said bushing and extending over said projections.

6. A packing gland comprising a rotatable shaft having an intermediate threaded portion for anchoring packing material, a frame member, a bushing interposed between said shaft and said frame member and having a threaded inner end, and a stationary hollow member having an internal diameter larger than said shaft and secured on the threaded end of said bushing tightly against said frame and extending over said threaded portion of said shaft.

FRANK B. HEWEL.